Feb. 17, 1931.  M. D. FITZGERALD  1,793,424
CYLINDER HEAD GASKET
Filed Aug. 7, 1929
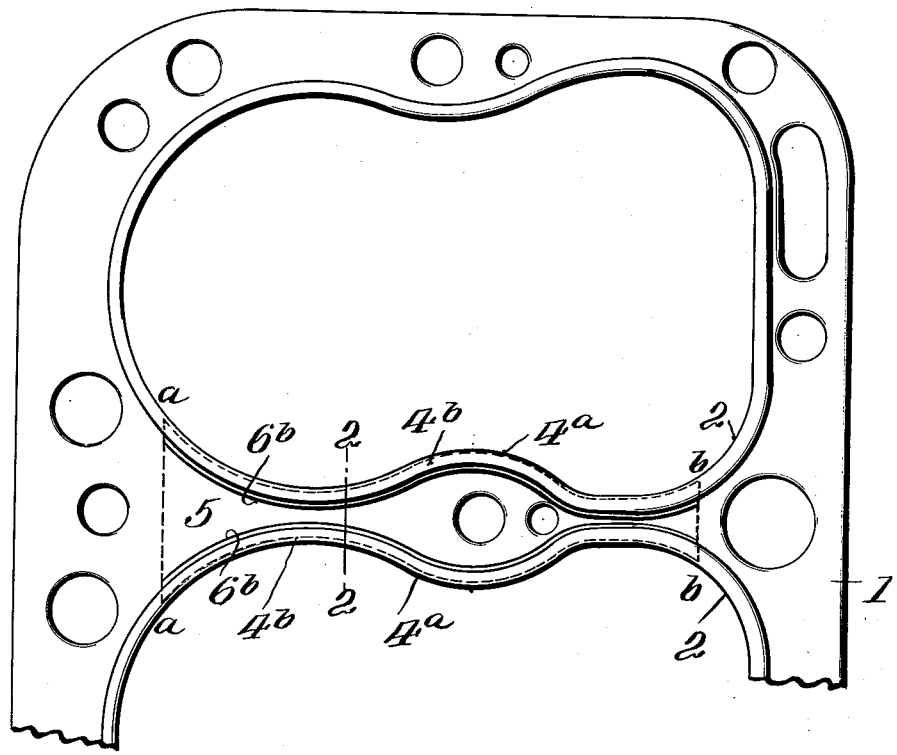
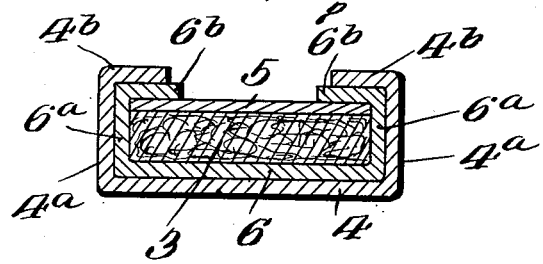
Inventor
Martin D. Fitzgerald
By Sturtevant & Mason
Attorneys Patented Feb. 17, 1931

1,793,424

UNITED STATES PATENT OFFICE

MARTIN D. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

CYLINDER-HEAD GASKET

Application filed August 7, 1929. Serial No. 384,180.

The invention relates to new and useful improvements in a gasket for internal combustion engines, and more particularly to a gasket adapted to be placed between the cylinder head and the cylinder block of a multiple cylinder engine.

An object of the invention is to provide a gasket for a multiple cylinder engine including a sheet of fibrous packing and pliable metal covering plates wherein the portion of the gasket in the region between adjacent cylinder openings is reinforced and strengthened by a metal sheathing which extends across the edges of the sheet of packing and which is folded back onto the upper covering plate so that said upper covering plate is enclosed within the sheathing in the region of of the reinforced section.

In the drawings:

Figure 1 is a plan view showing a portion of a gasket embodying the improvements.

Fig. 2 is an enlarged sectional view on the line 2—2 of Fig. 1.

The invention is directed to a gasket for a multiple cylinder internal combustion engine. In my co-pending application Serial Number 384,179, filed of even date herewith, I have shown a gasket consisting of an inner sheet of packing having covering plates and also having an inserted sheathing for covering the side edges of the gasket in the region between adjacent cylinder openings.

The present invention has to do with an improved arrangement of the sheathing so as to strengthen the gasket and insure a tight joint. The gasket includes, as noted, an inner sheet of packing which is preferably made of asbestos or other suitable fibrous material. It also includes pliable metal covering plates, one at each face of the sheet of packing. In the region between the cylinder openings the sheet of packing is first covered with an inserted metal sheathing which extends across the under face of the sheet and is folded up through the openings in the sheet. The upper covering plate is applied and then the upturned edge portions of the sheathing are turned onto said covering plate. The lower or under covering plate is then applied to the sheet of packing and the edge portions preferably turned through the cylinder opening and folded back onto the outer face of the folded back edge portions of the sheathing.

Referring more in detail to the drawings, the gasket includes a body portion 1 having cylinder openings indicated at 2, 2 in Fig. 1 of the drawings. The gasket includes an inner sheet of packing 3, an under covering plate 4, an upper covering plate 5, and an inserted metal sheathing 6. The metal sheathing 6 is preferably of copper and extends from the line a—a to the line b—b of Fig. 1. This is the region between adjacent cylinder openings and the purpose of the sheathing is to strengthen the gasket and insure a tight joint in this narrow region of the gasket which is subjected alternately to high pressure first on one side thereof and then on the other. The sheathing 6 is applied to the under face of the sheet of packing and is then folded through the openings 2, 2 as indicated at 6a, 6a in Fig. 2. The upper covering plate 5 is then applied to the upper face of the sheet of packing and the edge portions 6a, 6a of the sheathing are turned down as indicated at 6b, 6b onto the outer face of the upper covering plate 5. The lower or under covering plate 4 is then applied to the sheet of packing and the metal is turned through the openings 2, 2 as indicated at 4a, 4a and the upper edge portions are turned down as indicated at 4b, 4b into contact with the outer faces of the inturned portions of the sheathing. In the region where the sheathing is not applied these inturned edge portions 4b will, of course, make direct contact with the covering plate 5.

It will be apparent from the above description that the packing is completely housed at the side edge portions by the sheathing and by the upper covering plate. The metal sheathing and upper covering plate completely surround the packing in the region between the lines a—a and b—b and the outer covering plate surrounds the edge portions of the covered sheet of packing in the same region. When the cylinder head is applied the covering plate 5 will be forced into intimate contact with the sheet packing. The increased thickness in metal along the side edges in the region between the lines $a$—$a$ and $b$—$b$ will firmly grip the sheet of packing so as to prevent any possible chance of leakage either along the faces of the gasket or through the fibrous portion thereof.

It is obvious that the upper and lower metal covering plates may be joined and interlocked in other ways than shown and described so long as the edge portion is housed by the covering plates. The essential feature of the present invention is the arrangement of the sheathing plate within the covering plates and the particular arrangement of the side edge portions of the sheathing plate.

Having fully described my invention what I claim as new and desire to secure by Letters Patent, is:—

A gasket for internal combustion engines or the like including a sheet of packing material having a plurality of cylinder openings within its limits which are closely spaced relative to each other, an inserted metal sheathing extending across one face of the sheet of packing between the cylinder openings, a plate of pliable metal on the upper face of the sheet of packing and covering the same, said sheathing being folded through the cylinder openings and back onto the outer face of the covering plate, a plate of pliable metal on the under face of said sheet of packing, said plates being in overlapped relation along the edge of the cylinder openings and completely enclosing said sheathing and packing between the cylinder openings.

In testimony whereof, I affix my signature.

MARTIN D. FITZGERALD.